US008381506B2

(12) United States Patent
Bhatnagar et al.

(10) Patent No.: US 8,381,506 B2
(45) Date of Patent: Feb. 26, 2013

(54) LOW HEATING VALUE FUEL GAS BLENDING CONTROL

(75) Inventors: Ajanta Bhatnagar, Greer, SC (US); David Wesley Ball, Jr., Easley, SC (US); Kelvin Rafael Estrada, Norcross, GA (US); John Reuben Aiton, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 928 days.

(21) Appl. No.: 12/401,512

(22) Filed: Mar. 10, 2009

(65) Prior Publication Data

US 2010/0229524 A1    Sep. 16, 2010

(51) Int. Cl.
*F02G 3/00*    (2006.01)
*F02C 3/20*    (2006.01)
*F02C 3/22*    (2006.01)

(52) U.S. Cl. ............... 60/39.281; 30/39.463; 30/39.465

(58) Field of Classification Search ............... 60/39.281, 60/780, 39.463, 39.465, 39.12
See application file for complete search history.

(56) References Cited

U.S. PATENT DOCUMENTS

| 4,369,803 | A | * | 1/1983 | Furr | 137/6 |
| 4,677,829 | A | * | 7/1987 | Archer et al. | 60/780 |
| 4,761,948 | A | * | 8/1988 | Sood et al. | 60/39.281 |
| 2006/0234171 | A1 | * | 10/2006 | Tanabe et al. | 431/2 |
| 2006/0248894 | A1 | * | 11/2006 | Hiramoto et al. | 60/772 |
| 2008/0115482 | A1 | * | 5/2008 | LaGrow et al. | 60/39.281 |

* cited by examiner

*Primary Examiner* — William H Rodriguez
*Assistant Examiner* — Carlos A Rivera
(74) *Attorney, Agent, or Firm* — Fletcher Yoder P.C.

(57) ABSTRACT

A method includes blending a first fuel with a second fuel in a ratio to produce a third mixed fuel. The first fuel has a first heating value, the second fuel has a second heating value, and the third mixed fuel has a third heating value. In addition, the first heating value is different than the second heating value. The method also includes feedforward controlling the third heating value of the third mixed fuel via prediction and correction of a fuel flow rate of the first and/or second fuels to adjust the ratio of the first and second fuels based at least in part on a comparison between a measurement and a target for the third heating value.

13 Claims, 10 Drawing Sheets

LOW HEATING VALUE FUEL GAS BLENDING CONTROL

BACKGROUND OF THE INVENTION

The subject matter disclosed herein relates to blending control of fuel gases and, more particularly, to blending control of by-product gases received from a steel mill.

The production of steel via conventional blast furnaces results in the generation of large quantities of blast furnace gas, which is generally characterized by a lower heating value than typical fuel gases. Therefore, despite its relative abundance, blast furnace gas is generally unsuitable for use as a fuel source in combustion-driven equipment, such as gas turbines. However, coke oven gas is a second by-product gas generated during the production of steel. Coke oven gas is generally characterized by a higher heating value than typical fuel gases, but is generally available in much smaller quantities than blast furnace gas. As such, neither of these by-product gases from the production of steel are, by themselves, suitable as fuel gas sources.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fuel system. The fuel system includes a fuel blending system configured to blend a first fuel with a second fuel in a ratio to produce a third mixed fuel. The first fuel has a first heating value, the second fuel has a second heating value, and the third mixed fuel has a third heating value. In addition, the first heating value is lower than the second heating value. The fuel system also includes a feedforward controller configured to adjust the ratio of the first and second fuels to correct the third heating value.

In a second embodiment, a system includes a turbine fuel blending controller. The turbine fuel blending controller includes a feedforward control logic configured to predict a fuel flow rate of a first fuel and/or a second fuel being mixed to provide a third mixed fuel. The first and second fuels have different heating values from one another. In addition, the turbine fuel blending controller includes a feedback control logic configured to correct the fuel flow rate based at least in part on a comparison between the target heating value and a measured heating value of the third mixed fuel.

In a third embodiment, a method includes blending a first fuel with a second fuel in a ratio to produce a third mixed fuel. The first fuel has a first heating value, the second fuel has a second heating value, and the third mixed fuel has a third heating value. In addition, the first heating value is different than the second heating value. The method also includes feedforward controlling the third heating value of the third mixed fuel via prediction and correction of a fuel flow rate of the first and/or second fuels to adjust the ratio of the first and second fuels based at least in part on a comparison between a measurement and a target for the third heating value.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
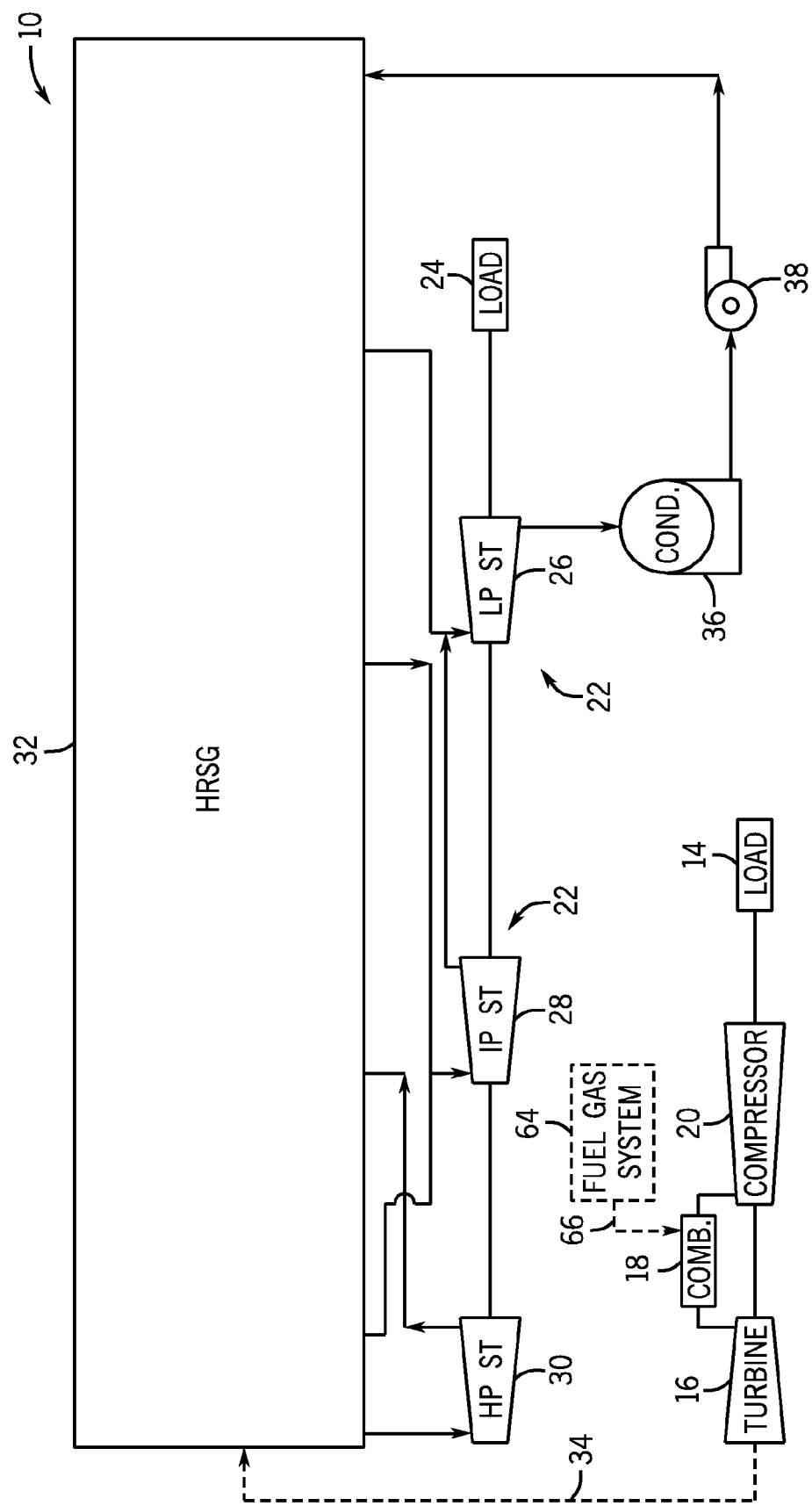
FIG. 1 is a schematic flow diagram of an embodiment of a combined cycle power generation system having a gas turbine, a steam turbine, a heat recovery steam generation system, and a fuel gas system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, the systems and methods described herein include controlling blending within a fuel gas system, which generates fuel gas for use in a gas turbine of a combined cycle power generation system. In particular, the fuel gas system may be configured to receive and blend multiple by-product gases, e.g., blast furnace gas and coke oven gas from a steel mill. One of the by-product gases (e.g., the blast furnace gas) may be characterized by a lower heating value than typical fuel gases while the other by-product gas (e.g., the coke oven gas) may be characterized by a higher heating value than typical fuel gases. However, the gas with the lower heating value (e.g., the blast furnace gas) may generally be available in significantly larger quantities than the gas with the higher heating value (e.g., the coke oven gas). Therefore, in order to generate a fuel gas suitable for combustion within the gas turbine, the heating value of the blended fuel gas (e.g., from blending the blast furnace gas and the coke oven gas) may be controlled and maintained above a certain predetermined target level at all times during operation.

In particular, a controller of the fuel gas system uses a combination feedforward/feedback control strategy. More specifically, the feedforward control loop uses process inputs and target heating values to predict the coke oven gas flow rate. The feedback control loop adjusts the predicted coke oven gas flow from the feedforward control loop with a flow correction factor based on a deviation observed between the measured and target heating values for the blended fuel gas at the gas turbine inlet. Addition of the feedforward loop to the feedback loop may reduce the time lag in system response between the fuel blending location and the inlet to the fuel gas module. In particular, the feedforward loop acts as a predictive loop, where the coke oven gas flow rate setpoint is predicted, and the feedback loop is a corrective loop which compares the measured and target heating values and corrects any deviation.

FIG. 1 is a schematic flow diagram of an embodiment of a combined cycle power generation system 10 having a gas turbine, a steam turbine, a heat recovery steam generation (HRSG) system, and a fuel gas system. As described in greater detail below, the fuel gas system may be configured to deliver fuel gas to the gas turbine by blending multiple by-product gases, e.g., blast furnace gas and coke oven gas from a steel mill. The system 10 may include a gas turbine 12 for driving a first load 14. The first load 14 may, for instance, be an electrical generator for producing electrical power. The gas turbine 12 may include a turbine 16, a combustor or combustion chamber 18, and a compressor 20. The system 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In addition, although the gas turbine 12 and steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The system 10 may also include a multi-stage HRSG 32. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

The gas turbine 12 may be operated using fuel gas from a fuel gas system 64. In particular, the fuel gas system 64 may supply the gas turbine 12 with fuel gas 66, which may be burned within the combustion chamber 18 of the gas turbine 12. Although natural gas may be a preferred fuel gas for use within the gas turbine 12, any suitable fuel gas 66 may be used. An important consideration when choosing a fuel gas for use within the gas turbine 12 is that the fuel gas be characterized by a minimum acceptable lower heating value (LHV). The minimum and maximum acceptable LHV will be application specific and may vary greatly between embodiments of the gas turbine 12. For example, in certain embodiments, the minimum and maximum acceptable LHV may be 950 kcal/Nm$^3$ and 1,400 kcal/Nm$^3$, respectively. However, in other embodiments, the minimum and maximum acceptable LHV may be 1,100 kcal/Nm$^3$ and 1,500 kcal/Nm$^3$, respectively. Indeed, the minimum acceptable LHV of 1,050 kcal/Nm$^3$ is merely exemplary and may, in fact, fall within a broad range (e.g., between 800 kcal/Nm$^3$ and 1,500 kcal/Nm$^3$).

If the fuel gas does not meet the particular minimum acceptable LHV, the gas turbine 12 may be more prone to instability, and so forth. As such, the fuel gas system 64 may be configured to ensure that the fuel gas 66 delivered to the gas turbine 12 meets minimum standards, such as a minimum acceptable LHV. The minimum acceptable LHV may, in fact, fluctuate over time based on varying operating conditions, such as ambient temperatures and pressures, varying operating parameters of the gas turbine 12, mechanical conditions of the gas turbine 12, and so forth.

The LHV for gases generally relates to the energy in the gas, assuming that the water vapor from combustion of hydrogen in the gas is not condensed. Conversely, the higher heating value (HHV) for gases generally relates to the energy in the gas, assuming that the water vapor from combustion of hydrogen in the gas is condensed. For consistency purposes, LHV will be used herein whenever referring to heating values.

The fuel gas system 64 may generate fuel gas 66 for use within the gas turbine 12 in various ways. In certain embodiments, the fuel gas system 64 may generate fuel gas 66 from other hydrocarbon resources. For example, the fuel gas system 64 may include a coal gasification process, wherein a gasifier breaks down coal chemically due to interaction with steam and the high pressure and temperature within the gasifier. From this process, the gasifier may produce a fuel gas 66 of primarily CO and H$_2$. This fuel gas 66 is often referred to as "syngas" and may be burned, much like natural gas, within the combustion chamber 18 of the gas turbine 12.

Figure 2:
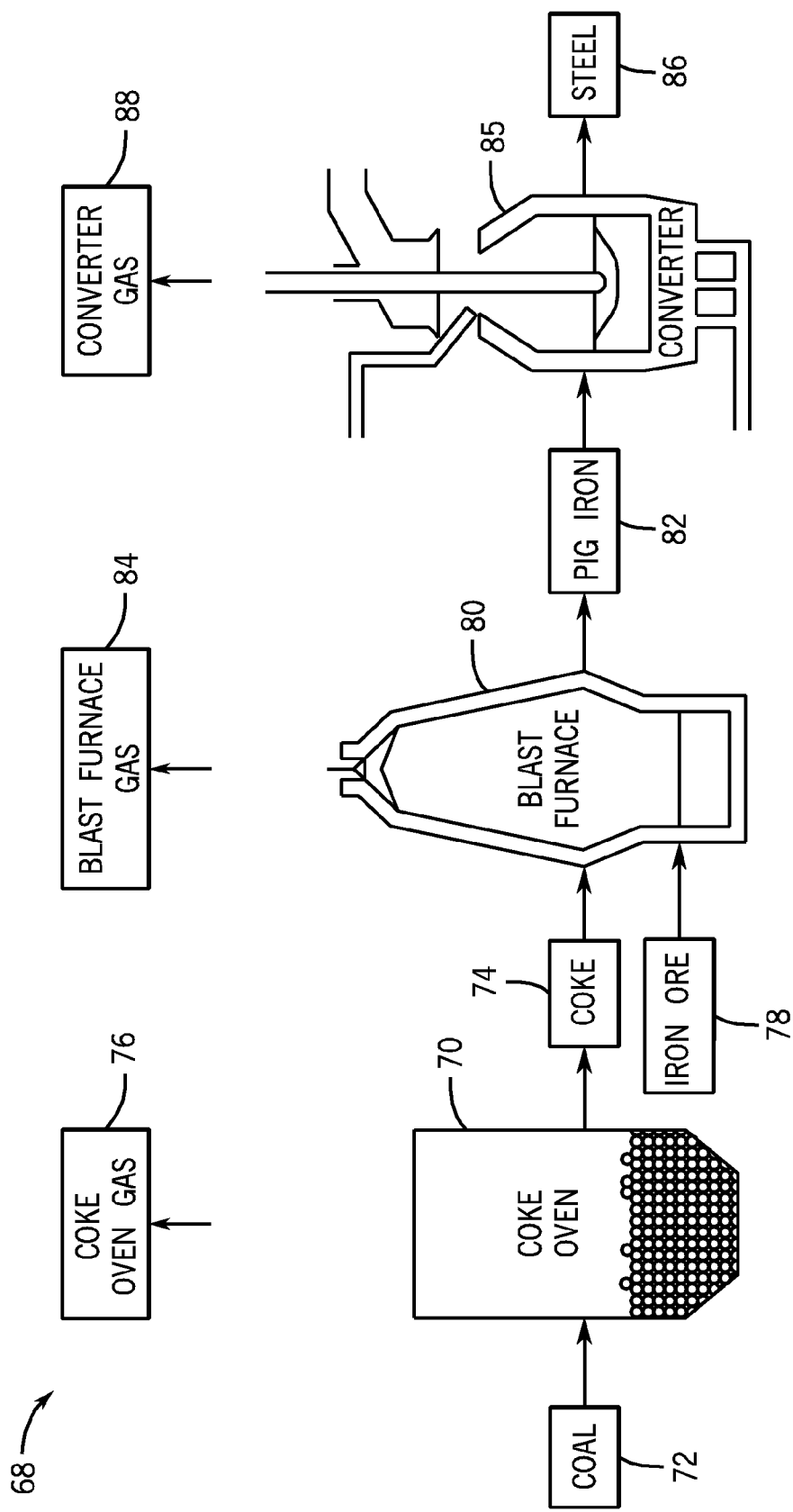
FIG. 2 is a process flow diagram of an embodiment of a steel mill which may generate fuel gas sources for use within the fuel gas system.

However, in other embodiments, the fuel gas system 64 may receive and further process fuel gas sources from other processes to generate the fuel gas 66 used by the gas turbine 12. For example, in certain embodiments, the fuel gas system 64 may receive fuel gas sources generated by a steel mill. FIG. 2 is a process flow diagram of an embodiment of a steel mill 68 which may generate fuel gas sources for use within the fuel gas system 64. Steel production processes of the steel mill 68 typically generate large volumes of specialty gases as by-products.

For instance, as illustrated in FIG. 2, there are three main process stages in the production of steel, all of which generate gases. In particular, a coke oven 70 may receive coal 72, such as pit coal, and produce coke 74 using dry distillation of the coal 72 in the absence of oxygen. Coke oven gas 76 may also be generated as a by-product of the process for producing coke 74 within the coke oven 70. Next, the coke 74 produced by the coke oven 70, as well as iron ore 78, may be directed into a blast furnace 80. Pig iron 82 may be produced within the blast furnace 80. In addition, blast furnace gas 84 may be generated as a by-product of the blast furnace 80. The pig iron 82 produced by the blast furnace 80 may then be directed into a converter 85, within which the pig iron 82 may be refined into steel 86 with oxygen and air. In addition, converter gas 88 may be generated as a by-product of the process for producing steel 86 within the converter 85.

Therefore, the steel mill 68 may generate three separate by-product gases, e.g., the coke oven gas 76, the blast furnace gas 84, and the converter gas 88, all of which may be characterized by different chemical compositions and properties. For example, the coke oven gas 76 may generally be comprised of approximately 50-70% hydrogen ($H_2$) and 25-30% methane ($CH_4$) and may have an LHV of approximately 4,250 kcal/$Nm^3$. Conversely, the blast furnace gas 84 may generally be comprised of approximately 5% hydrogen and 20% carbon monoxide (CO) and may have an LHV of only approximately 700 kcal/$Nm^3$. In addition, the converter gas 88 may generally be comprised of approximately 60+% carbon monoxide and may have an LHV of approximately 2,500 kcal/$Nm^3$. As such, the blast furnace gas 84 may have a considerably lower LHV than both the coke oven gas 76 and the converter gas 88. Also, by way of comparison, other typical fuel gases, such as natural gas, may have an LHV between the lower value of the blast furnace gas 84 and the higher values of the coke oven gas 76 and the converter gas 88. For instance, natural gas is generally characterized as having an LHV between approximately 1,000 kcal/$Nm^3$ and 1,100 kcal/$Nm^3$. As described in greater detail below, the fuel gas system 64 may blend the blast furnace gas 84 with the coke oven gas 76 to generate a fuel gas 66 meeting minimum and maximum acceptable LHV thresholds. However, although the embodiments disclosed herein are primarily directed toward the blending of blast furnace gas 84 and coke oven gas 76, the control techniques described herein may be extended to the blending of other fuel and diluent sources. For example, in certain embodiments, the control techniques described herein may be used to control the blending of Corex with Nitrogen to obtain a target LHV for the Corex-Nitrogen blend.

Figure 3:
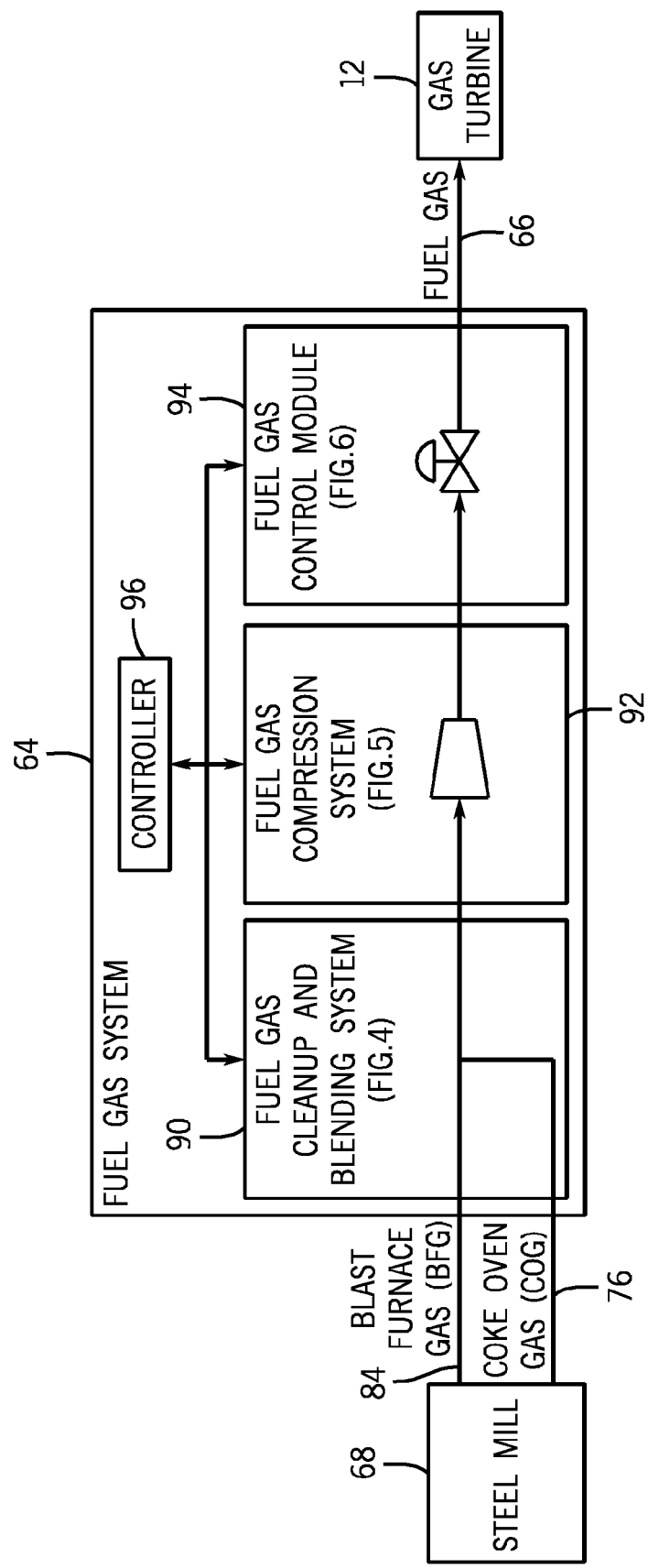
FIG. 3 is a process flow diagram of an embodiment of the fuel gas system, which includes a fuel gas cleanup and blending system, a fuel gas compression system, and a fuel gas control module.

The fuel gas system 64 may include three distinct sub-systems. In particular, FIG. 3 is a process flow diagram of an embodiment of the fuel gas system 64, which includes a fuel gas cleanup and blending system 90, a fuel gas compression system 92, and a fuel gas control module 94. As described above, blast furnace gas (BFG) 84 and coke oven gas (COG) 76 may be delivered to the fuel gas system 64 from the steel mill 68. As described in greater detail below with respect to FIG. 4, the blast furnace 84 and coke oven gas 76 may be cleaned and blended within the fuel gas cleanup and blending system 90, generating the fuel gas 66 mixture. In addition, as described in greater detail below with respect to FIG. 5, the pressure of the cleaned and blended fuel gas 66 may be increased within the fuel gas compression system 92. Once the pressure of the fuel gas 66 has been increased, the flow of the fuel gas 66 maybe controlled by the fuel gas control module 94, as described in greater detail below with respect to FIG. 6.

Additionally, the fuel gas system 64 may include a controller 96, which may be used to control operation of the fuel gas cleanup and blending system 90, fuel gas compression system 92, and fuel gas control module 94. In particular, as described in greater detail below, the controller 96 may be configured to adjust the flow rate of the coke oven gas 76 into the fuel gas system 64. In doing so, the controller 96 may be capable of controlling the blending of the blast furnace gas 84 and the coke oven gas 76 such that the LHV of the resultant fuel gas 66 mixture meets thresholds for minimum and maximum acceptable heating value.

Figure 4:
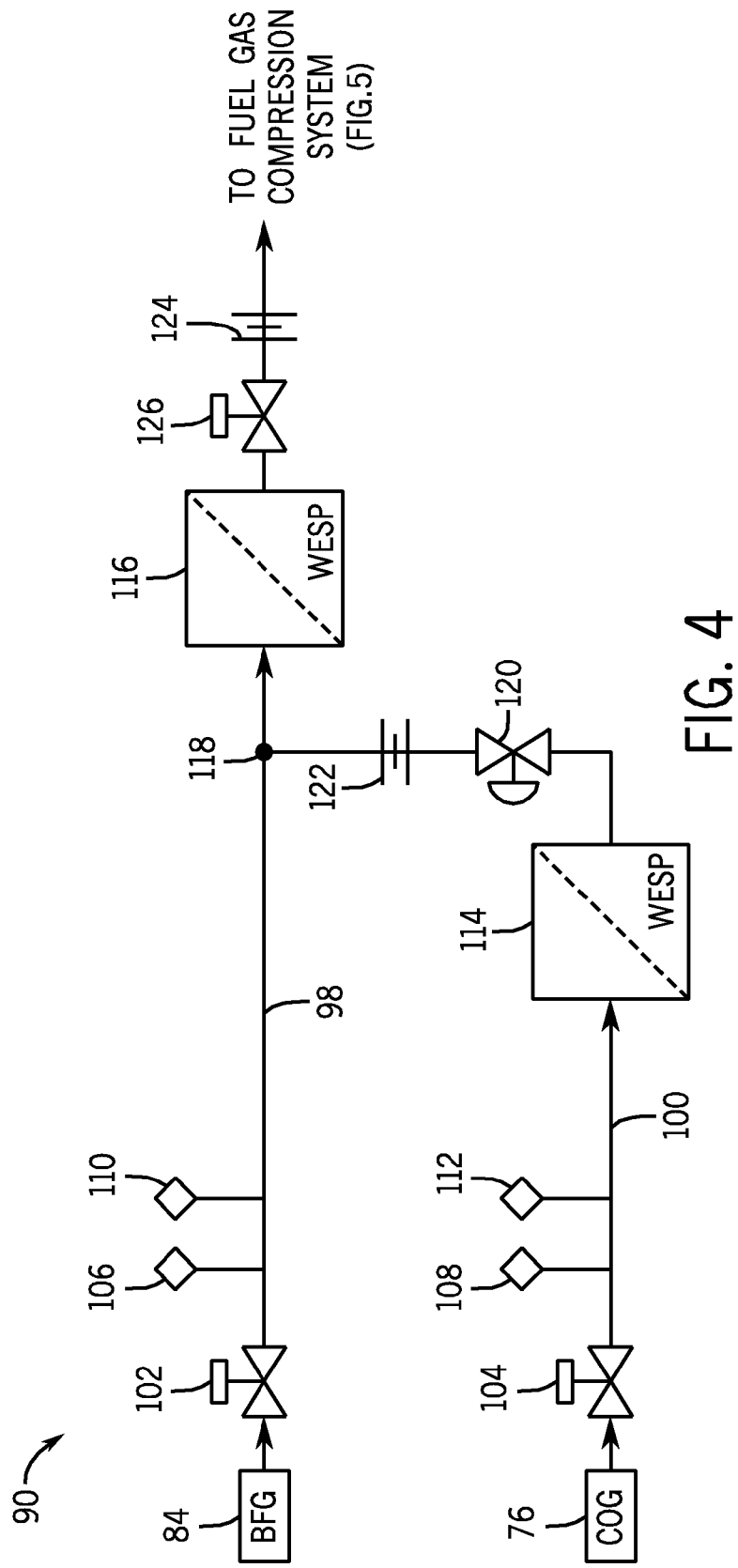
FIG. 4 is a schematic flow diagram of an embodiment of the fuel gas cleanup and blending system of the fuel gas system of FIG. 3.
Figure 5:
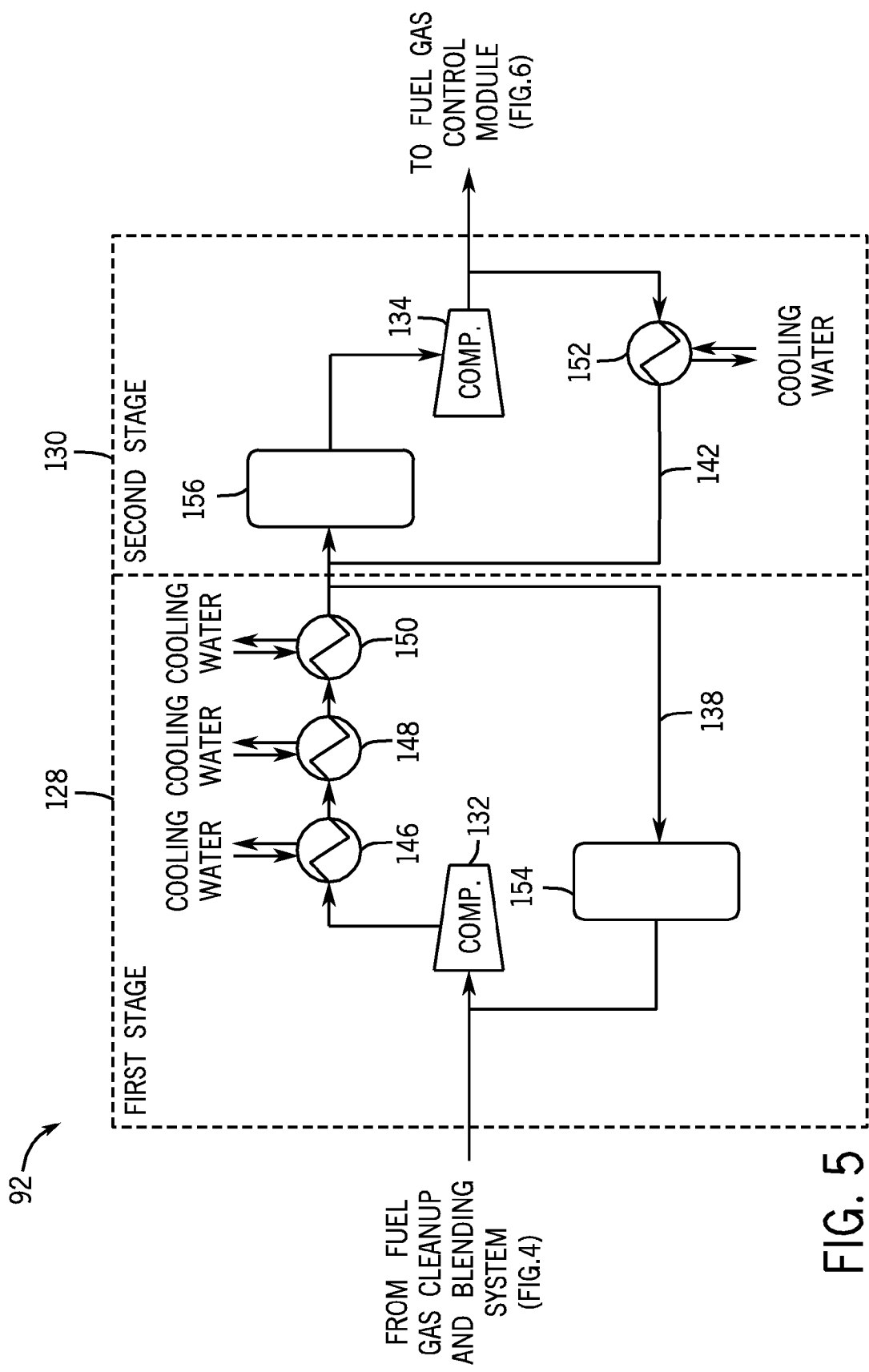
FIG. 5 is a schematic flow diagram of an embodiment of the fuel gas compression system of the fuel gas system of FIG. 3.
Figure 6:
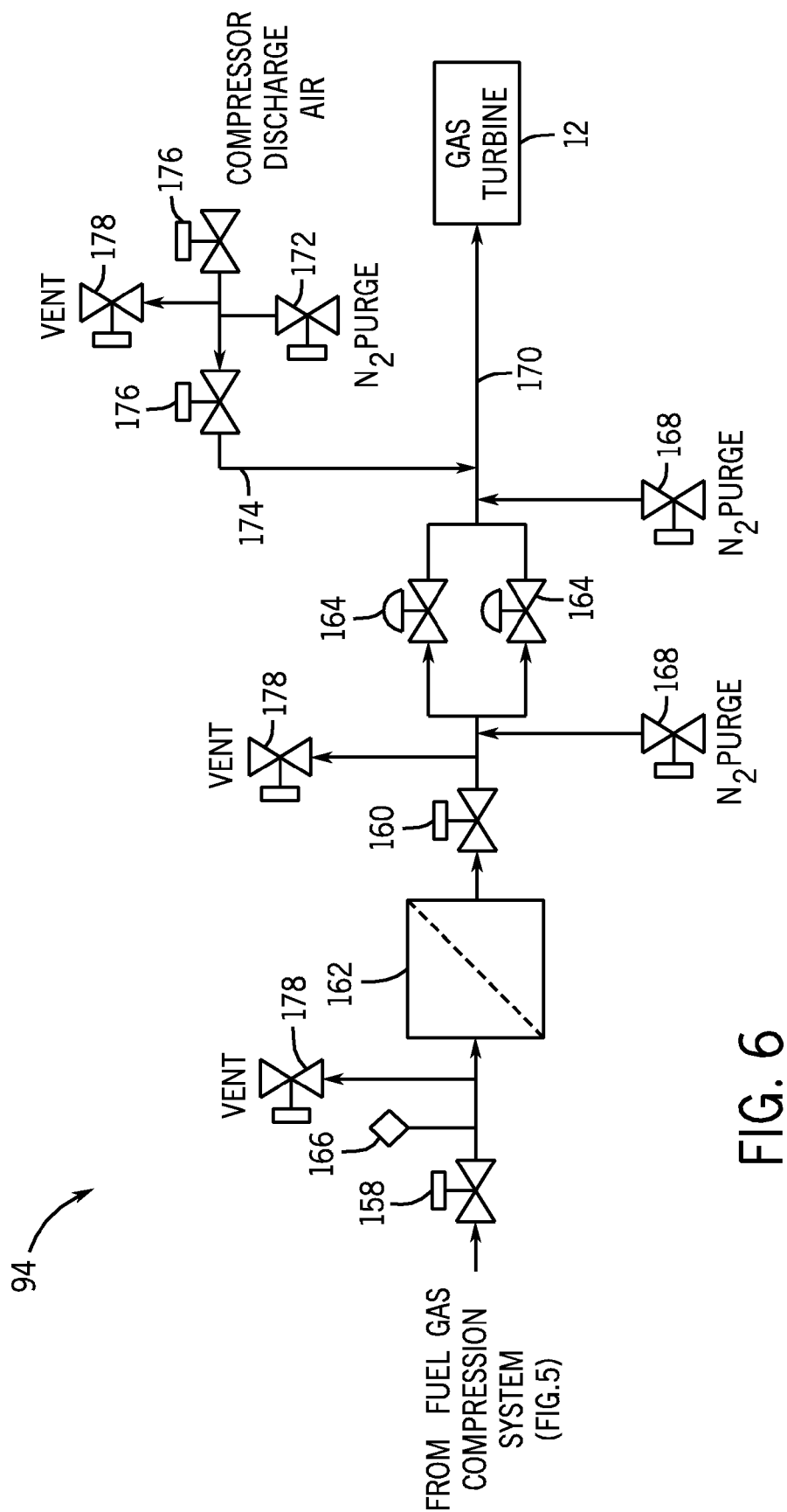
FIG. 6 is a schematic flow diagram of an embodiment of the fuel gas control module of the fuel gas system of FIG. 3.

FIGS. 4 through 6 are schematic flow diagrams of the three main sub-systems of the fuel gas system 64 illustrated in FIG. 3, e.g., the fuel gas cleanup and blending system 90, fuel gas compression system 92, and fuel gas control module 94. The specific embodiments of FIGS. 4 through 6 may be configured differently than illustrated. However, the components of the fuel gas cleanup and blending system 90, the fuel gas compression system 92, and the fuel gas control module 94 illustrated in FIGS. 4 through 6 are illustrative of core components of the fuel gas system 64 in accordance with the present techniques.

In particular, FIG. 4 is a schematic flow diagram of an embodiment of the fuel gas cleanup and blending system 90 of the fuel gas system 64 of FIG. 3. Blast furnace gas (BFG) 84 and coke oven gas (COG) 76 may be received into the fuel gas cleanup and blending system 90 through separate feed lines, e.g., a BFG feed line 98 and a COG feed line 100, respectively. In particular, a BFG isolation valve 102 may be used to turn the flow of blast furnace gas 84 into the BFG feed line 98 on or off and a COG isolation valve 104 may be used to turn the flow of coke oven gas 76 into the COG feed line 100 on or off. More specifically, the BFG isolation valve 102 and the COG isolation valve 104 may be used to adjust the flow of the fuel gas 66 to the gas turbine 12 between "on" and "off" positions.

Both the BFG feed line 98 and the COG feed line 100 may include at least one gas chromatograph. In particular, the BFG feed line 98 may include a BFG gas chromatograph 106 and the COG feed line 100 may include a COG gas chromatograph 108. The gas chromatographs 106, 108 may be used as gas analyzing devices for collecting LHV, specific gravity, gas composition, and other measurements of the respective gas flow. The gas chromatographs 106, 108 may, for instance, sample each respective gas flow every few minutes (e.g., approximately every 4 or 5 minutes). In addition to the gas chromatographs 106, 108, both the BFG feed line 98 and the COG feed line 100 may include at least one calorimeter. In particular, the BFG feed line 98 may include a BFG calorimeter 110 and the COG feed line 100 may include a COG calorimeter 112. As such, the calorimeters 110, 112 may, in part, be used for redundancy purposes. As will be described in greater detail below, the LHV of the blast furnace gas 84 and the coke oven gas 76, measured by both the gas chromatographs 106, 108 and the calorimeters 110, 112, may be used by the controller 96 of FIG. 3 to determine how to control the flow rates of these gases. In certain embodiments, only calorimeters 110, 112 may be used to measure the LHVs for the respective gas flows in that the calorimeters 110, 112 generally have quicker response times than the gas chromatographs 106, 108.

The fuel gas cleanup and blending system 90 may also include two wet electrostatic precipitators (WESPs). As illustrated in FIG. 4, a COG WESP 114 may be located in the COG feed line 100 and a combined flow WESP 116 may be located downstream of the BFG-COG mixing point 118, where the blast furnace gas 84 and the coke oven gas 76 are mixed together to create the fuel gas 66. The COG WESP 114 may be used to purify the coke oven gas 76 from tar and particulates. In addition, the combined flow WESP 116 may be used to purify the fuel gas 66 mixture from debris and particulates. Both WESP units 114, 116 may, in certain embodiments, be sized with three flow lines capable of handling 50% flow capacity for the respective gas streams, with the capability of switching between redundant parallel units. In other words, the WESP units 114, 116 may be configured with multiple flow lines, one of which may be used as a redundant flow line for reliability purposes. For instance, in other embodiments, the WESP units 114, 116 may be sized with five flow lines capable of handling 25% flow capacity for the respective gas streams.

The fuel gas cleanup and blending system 90 may also include a COG flow control valve 120 in the COG feed line 100 downstream of the COG WESP 114 but upstream of the BFG-COG mixing point 118. As described in greater detail below, the COG flow control valve 120 may function as a flow regulator and may control and meter the coke oven gas 76 to ensure that the LHV of the fuel gas 66 used in the gas turbine 12 is within acceptable limits during all operating conditions. In particular, the COG flow control valve 120 may control and meter the high-LHV coke oven gas 76 to blend with the low-LHV blast furnace gas 84 to raise the LHV of the fuel gas 66 mixture within gas turbine 12 operating limits.

In addition to the COG flow control valve 120, the fuel gas cleanup and blending system 90 may also include two flowmeters for metering the flow of blast furnace gas 84 and coke oven gas 76. In particular, the fuel gas cleanup and blending system 90 may include a COG flowmeter 122 in the COG feed line 100 downstream of the COG flow control valve 120 but upstream of the BFG-COG mixing point 118. In addition, the fuel gas cleanup and blending system 90 may include a combined flow flowmeter 124 downstream of the combined flow WESP 116. The COG flowmeter 122 may measure the flow rate of the coke oven gas 76 while the combined flow flowmeter 124 may measure the flow rate of the combined fuel gas 66 mixture. Additionally, the fuel gas cleanup and blending system 90 may include a combined flow isolation valve 126 in between the combined flow WESP 116 and the combined flow flowmeter 124 which, in addition to the BFG isolation valve 102 and the COG isolation valve 104, may be used to adjust the flow of the fuel gas 66 to the gas turbine 12 between "on" and "off" positions.

As described above with respect to FIG. 2, the production of steel results in the generation of large quantities of low-LHV blast furnace gas 84. For instance, the blast furnace gas 84 may have an LHV of approximately 700 kcal/Nm$^3$ and may be available at pressures slightly above atmospheric pressure. The coke oven gas 76, another by-product gas of the steel mill 68, may be blended with the low-LHV blast furnace gas 84 to increase the heating value of the fuel gas 66 mixture to a minimum acceptable LHV needed for the gas turbine 12. Maintaining the coke oven gas 76 supply pressure slightly higher than the blast furnace gas 84 supply pressure may ensure adequate fuel gas 66 blending. However, the coke oven gas 76 may also contain large amounts of tars and particulates. As such, the fuel gas cleanup and blending system 90 may be configured to remove tar, dust, and particulates from the fuel gas 66 (e.g., using the WESPs 114, 116) prior to compression of the fuel gas 66 and delivery to the gas turbine 12.

Another consideration in the control strategy of the fuel gas system 64 is that the blast furnace gas 84, although generally having the lowest LHV, is the most abundant of the by-product gases generated by the steel mill 68. Conversely, although the coke oven gas 76 is a higher quality gas, it is also usually available in smaller amounts. Therefore, the controller 96 of the fuel gas system 64 may take into consideration these relative quantities when evaluating an appropriate control strategy.

After being cleaned and blended in the fuel gas cleanup and blending system 90, the fuel gas 66 mixture may be directed into the fuel gas compression system 92 of the fuel gas system 64. The low-pressure fuel gas 66 mixture from the fuel gas cleanup and blending system 90 may be boosted by the fuel gas compression system 92 before the fuel gas 66 is injected into the combustion chamber 18 of the gas turbine 12. FIG. 5 is a schematic flow diagram of an embodiment of the fuel gas compression system 92 of the fuel gas system 64 of FIG. 3. As illustrated in FIG. 5, the fuel gas compression system 92 may include two or more stages, e.g., a first stage 128 and a second stage 130.

Both the first stage 128 and the second stage 130 may include at least one compressor, such as a centrifugal compressor, which may be used to increase the pressure of the fuel gas 66. In particular, the first stage 128 may include a first compressor 132 and the second stage 130 may include a second compressor 134. Both the first and second compressors 132, 134 may be designed such that the discharge pressure of the fuel gas 66 from the second compressor 134 is sufficient to satisfy fuel pressure requirements of the gas turbine 12. For example, the discharge pressure of the fuel gas 66 from the second compressor 134 may be maintained above approximately 300 pounds per square inch atmospheric (psia). However, in certain embodiments, the discharge pressure of the fuel gas 66 from the second compressor 134 may be maintained above other predetermined thresholds (e.g., 200, 250, 350, and 400 psia), depending on the fuel pressure requirements of the gas turbine 12.

In addition, in certain embodiments, the first stage 128 of the fuel gas compression system 92 may include a series of heat exchangers or coolers, e.g., a high-pressure intercooler 146, a low-pressure intercooler 148, and a trim cooler 150. As illustrated in FIG. 5, these three coolers 146, 148, 150 may be located downstream of the first compressor 132 but upstream of the second stage 130. These three coolers 146, 148, 150 may be used to ensure that the temperature of the fuel gas 66 into the second stage 130 of the fuel gas compression system 92 remains below a pre-determined temperature level. For instance, the fuel gas 66 into the second stage 130 of the fuel gas compression system 92 may be held below 104° F.

One important design consideration addressed by the present embodiments is the ability to control the LHV of the fuel gas 66 mixture despite substantial changes in moisture levels in the fuel gas 66 mixture that are introduced by the first and second compressor stages 128, 130 and the three coolers 146, 148, 150. In particular, during cooling of the fuel gas 66 mixture by the three coolers 146, 148, 150, a certain degree of moisture will be introduced into the fuel gas 66 mixture. Therefore, the LHV of the fuel gas 66 mixture will change (e.g., decrease) due to this introduction of moisture. However, the control techniques described in greater detail below may account for these changes in moisture levels and adequately control the LHV of the fuel gas 66 mixture to a target level for the fuel gas 66 mixture.

In addition, in certain embodiments, the second stage 130 of the fuel gas compression system 92 may include a by-pass heat exchanger or cooler 152 in a second re-circulation line 142. The by-pass cooler 152 may be used to ensure that the temperature of the fuel gas 66 re-circulating back to the second compressor 134 remains below a predetermined temperature level (e.g., 80° F., 100° F., 120° F., 140° F., 160° F., and so forth). The inlet coolant source for the by-pass cooler 152 may be a cooling water circuit and the water outlet may discharge into a heat rejection system.

Additionally, the fuel gas compression system 92 may include a separator in each of the stages 128, 130. In particular, the first stage 128 may include a first separator 154 in a first re-circulation line 138 and the second stage 130 may include a second separator 156 just upstream of the second compressor 134. The separators 154, 156 may be used to remove condensed water from the fuel gas 66 which may be introduced into the fuel gas 66 due to the temperature drop across the high-pressure intercooler 146, the low-pressure intercooler 148, the trim cooler 150, and the by-pass cooler 152.

After the pressure of the fuel gas 66 has been boosted in the fuel gas compression system 92, the fuel gas 66 may be directed into the fuel gas control module 94 of the fuel gas system 64. The fuel gas control module 94 may be configured to control the flow of the fuel gas 66 into the combustion chamber 18 of the gas turbine 12 through a series of interconnected piping, manifolds, and purge systems. FIG. 6 is a schematic flow diagram of an embodiment of the fuel gas control module 94 of the fuel gas system 64 of FIG. 3.

The fuel gas control module 94 may include a safety shut off valve (SSOV) 158 and an auxiliary stop valve 160 for emergency shutoff of the fuel gas 66 into the gas turbine 12. The fuel gas control module 94 may also include a fuel strainer 162 to protect the combustion chamber 18 of the gas turbine 12 from debris, which may be present in the fuel gas 66. In addition, the fuel gas control module 94 may include a series of gas control valves 164 in parallel, which may control the flow of the fuel gas 66 into the combustion chamber 18 of the gas turbine 12. In the illustrated embodiment, two gas control valves 164 are used in parallel. However, any suitable number of gas control valves 164 may be used. In addition, the fuel gas control module 94 may include a fuel gas calorimeter 166, which may be used to measure the LHV of the fuel gas 66 mixture after cleaning, blending, and compression. The fuel gas control module 94 may also include temperature and pressure sensors for measurement of the temperature and pressure of the fuel gas 66 being delivered.

The fuel gas control module 94 may also include a purge system of inert nitrogen ($N_2$) and compressor discharge air that may be used during fuel transfers, startup, and shutdown. In particular, the fuel gas control module 94 may include two nitrogen purge valves 168 in a main feed line 170, one upstream of the gas control valves 164 and one downstream of the gas control valves 164, for instance. The nitrogen purge valves 168 may be used to control the flow of nitrogen into the fuel gas 66 mixture. Also, the fuel gas control module 94 may include one nitrogen purge valve 172 in a compressor discharge air feed line 174. The compressor discharge air feed line 174 may also include two compressor discharge air isolation valves 176, which may be used to control the flow of compressor discharge air into the fuel gas 66 mixture. The fuel gas control module 94 may also include several vent valves 178.

In general, as described above, the fuel gas control module 94 may be configured to control the flow of the fuel gas 66 into the combustion chamber 18 of the gas turbine 12. In addition, the fuel strainer 162 may help ensure that the fuel gas 66 delivered to the gas turbine 12 is relatively free of debris, which may otherwise adversely affect performance of the gas turbine 12. Additionally, the nitrogen and compressor discharge air purge systems may help ensure that certain parameters of the fuel gas 66 (e.g., pressure, fuel ratios, and so forth) are maintained.

The fuel gas system 64 may be designed to startup using liquid fuel. The compressor discharge air may be used for purging the fuel gas 66 during steady-state liquid fuel operation. The manifold piping and compressor discharge air feed line 174 may be purged with nitrogen before blast furnace gas 84 is introduced into the fuel gas system 64. This may help mitigate the possibility of auto-ignition in the piping from mixing of blast furnace gas 84 with hot compressor discharge air. Once a stable power output point has been reached, the fuel gas system 64 may transfer from using liquid fuel to blast furnace gas 84 fuel. At the point where the fuel gas system 64 switches from liquid fuel to blast furnace gas 84 fuel, the gas control valves 164 may only be open to approximately 10% minimum stroke or some other minimum stroke, such as 5%, 15%, 20%, and so forth.

Figure 7:
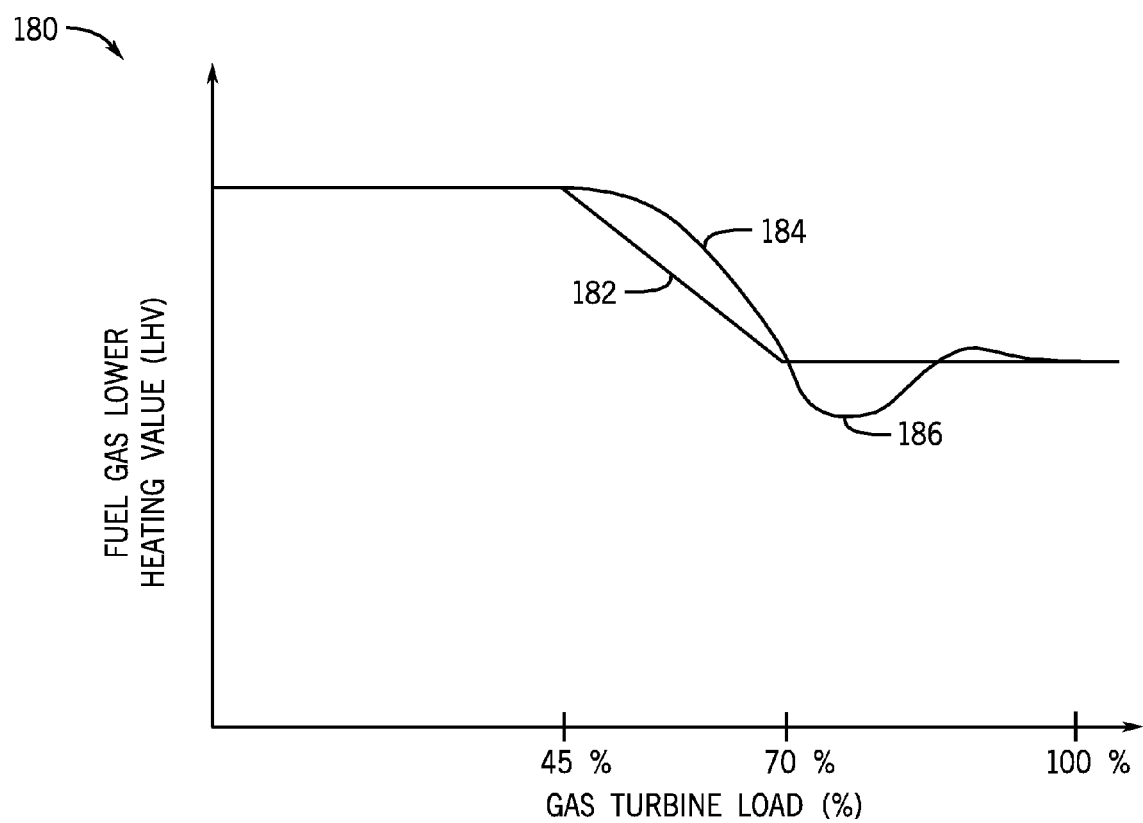
FIG. 7 is a chart depicting a target LHV schedule and measured LHV of the fuel gas during loading from fuel transfer to a base load of the gas turbine.

FIG. 7 is a chart 180 depicting a target LHV schedule 182 and measured LHV 184 of the fuel gas 66 during loading from fuel transfer to a base load of the gas turbine 12. In other words, the chart 180 primarily depicts the target LHV schedule 182 and measured LHV 184 from the point in time at which the fuel gas system 64 transfers from liquid fuel to fuel gas to the point in time at which base loading of the gas turbine 12 is achieved. It should be noted that the measured LHV 184 is based on transient model simulation results, which may include instrumentation response time, time lag between the BFG-COG mixing point 118 and an inlet to the fuel gas control module 94, and so forth. The model also includes all time lags from piping, equipment, and so forth.

As illustrated, for example, at about 45% loading of the gas turbine 12, the target LHV schedule 182 may be at a higher value. Once a certain base loading (e.g., about 70%) of the gas turbine 12 has been achieved, the target LHV schedule 182 may be a lower value. The target LHV schedule 182 may gradually decrease between these two loading conditions. However, as illustrated in FIG. 7, the actual measured LHV 184 of the fuel gas 66 may not follow perfectly with the target LHV schedule 182. This may be due, in part, to a response lag. One particular issue may be the possibility of overshoot and undershoot. For example, at an overshoot point 186, the heating value of the fuel gas 66 may not be sufficient to reduce the possibility of combustion instability. In addition, undershoot below a minimum LHV threshold may cause combustion blowout. Therefore, in order to add sufficient margin to reduce the possibility of combustion instability, the blending between the blast furnace gas 84 and the coke oven gas 76 may be more efficiently controlled such that the LHV of the fuel gas 66 delivered to the gas turbine 12 meets the target LHV schedule 182.

As described above with respect to FIG. 4, the coke oven gas 76 flow is controlled and metered by the COG flow control valve 120. In addition, the LHV of the blast furnace gas 84 and the coke oven gas 76 are measured by the gas chromatographs 106, 108 and the calorimeters 110, 112, as illustrated in FIG. 4. Additionally, the LHV of the fuel gas 66 mixture is measured at the inlet of the fuel gas control module 94 by the fuel gas calorimeter 166, as illustrated in FIG. 6. Furthermore, the blast furnace gas 84 and coke oven gas 76 flow rates are measured by the flowmeters 122, 124, as illustrated in FIG. 4.

Figure 8:
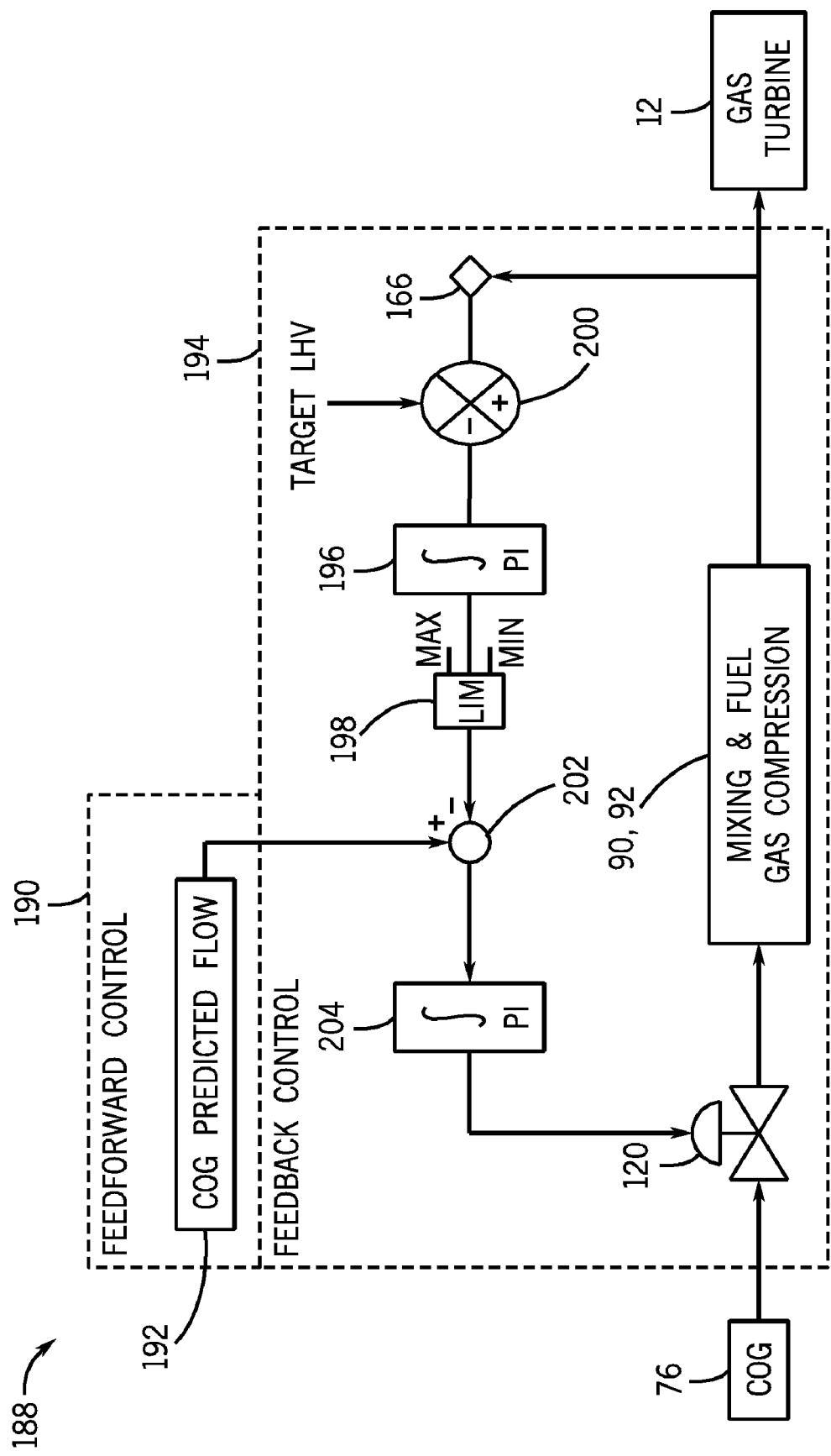
FIG. 8 is an embodiment of controller logic used by the controller of the fuel gas system of FIG. 3.

Using these measured values, the controller 96 of the fuel gas system 64 may use a feedforward/feedback control strategy to control the blending of the blast furnace gas 84 and the coke oven gas 76. FIG. 8 is an embodiment of controller logic 188 used by the controller 96 of the fuel gas system 64 of FIG. 3. The feedforward control loop 190 uses the measured values described above and target LHVs to predict the coke oven gas mass flow rate 192 according to the material balance equation:

$$\text{Predicted } \dot{m}_{COG} = \frac{(\dot{m}_{total})(LHV_{target})}{LHV_{COG}} - \frac{\dot{m}_{BFG} LHV_{BFG}}{LHV_{COG}}$$

where $\dot{m}_{total}$ is the total mass flow rate of the fuel gas 66, $\dot{m}_{BFG}$ is the mass flow rate of the blast furnace gas 84 from the steel mill 68, $LHV_{COG}$ and $LHV_{BFG}$ are the LHVs of the blast furnace gas 84 and the coke oven gas 76 from the steel mill 68, respectively. The predicted coke oven gas mass flow rate 192 is calculated based on gas turbine 12 fuel requirements at given operating conditions.

The feedback control loop 194 includes a first proportional-integral (PI) controller 196 and a max/min limit 198, which compare the measured LHV from the fuel gas calorimeter 166 to a target LHV 200 and determines a flow correction factor to adjust the predicted coke oven gas flow rate 192 from the feedforward control loop 190. The feedback control loop 194 adjusts the predicted coke oven gas flow rate 192 from the feedforward control loop 190 with the flow correction factor based on a deviation observed between the measured and the target LHV for the fuel gas 66 at the gas turbine 12 inlet. The adjusted flow rate 202 then becomes the target coke oven gas 76 flow rate and is used as a setpoint for a second PI controller 204, which modulates the COG flow control valve 120 to control the blending of the blast furnace gas 84 and the coke oven gas 76, thereby ultimately controlling the LHV of the fuel gas 66 mixture to the target value.

By using feedforward prediction of the coke oven gas 76 flow rate, the controller logic 188 may ensure that modifications in the blending of the blast furnace gas 84 and the coke oven gas 76 are implemented in a more efficient manner. In particular, the feedforward nature of the controller logic 188, instead of passively reacting to variations in the feedback control loop 194, may actively predict the coke oven gas 76 flow rate for the next subsequent time period. By more actively reacting to current operating conditions, the controller logic 188 may help ensure that characteristics of the fuel gas 66 meet the requirements of the gas turbine 12.

Figure 9:
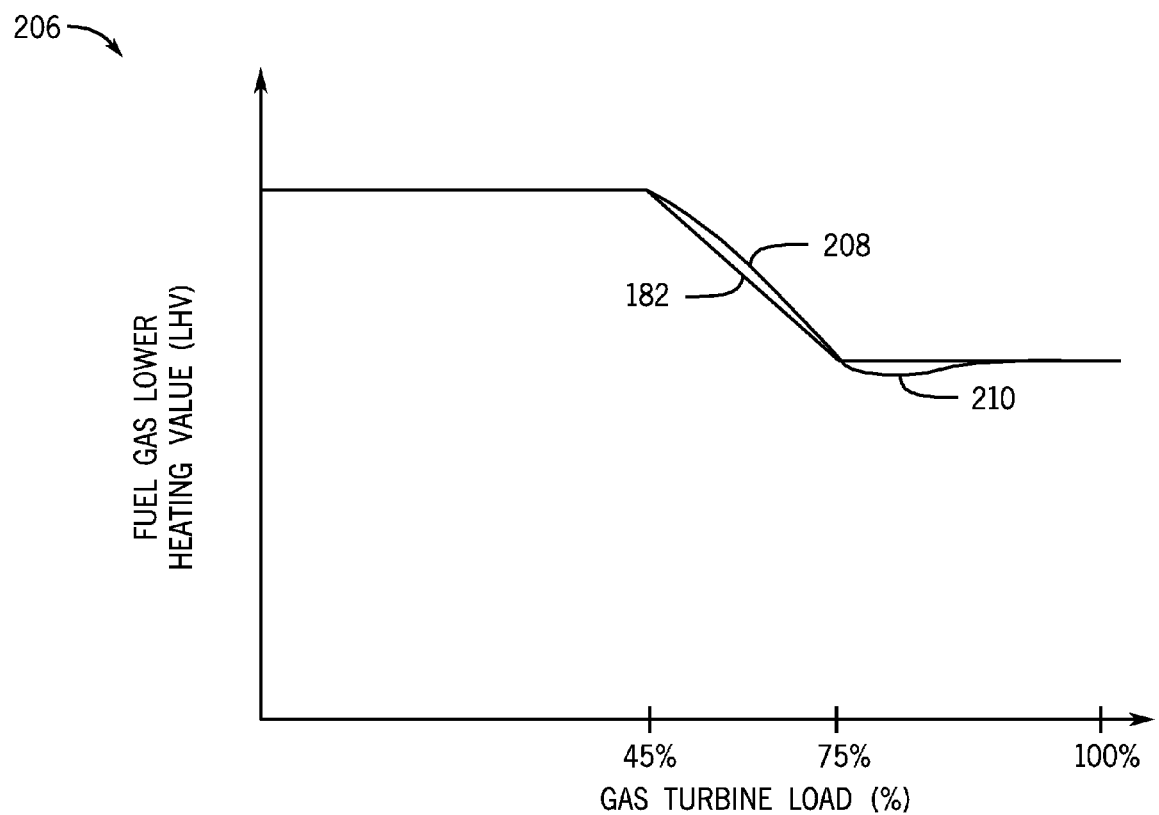
FIG. 9 is a chart depicting the target LHV schedule of FIG. 7 with measured LHV of the fuel gas during loading from fuel transfer to base load of the gas turbine, utilizing the controller logic of FIG. 8.

For example, FIG. 9 is a chart 206 depicting the target LHV schedule 182 of FIG. 7 with measured LHV 208 of the fuel gas 66 during loading from fuel transfer to base load of the gas turbine 12, utilizing the controller logic 188 of FIG. 8. As illustrated, the actual measured LHV 208 of the fuel gas 66 may follow more closely to the target LHV schedule 182 than illustrated in FIG. 7. For instance, an overshoot point 210 and undershoot may be much less drastic than illustrated in FIG. 7. Indeed, the feedforward prediction control of the controller logic 188 may, in many situations, reduce or even eliminate any overshoot. Thus, the requirements of the gas turbine 12 (e.g., minimum and maximum LHV of the fuel gas 66) may be more efficiently met. In particular, the possibility of combustion instability and blowout, among other adverse operating conditions, may be substantially reduced or eliminated.

Figure 10:
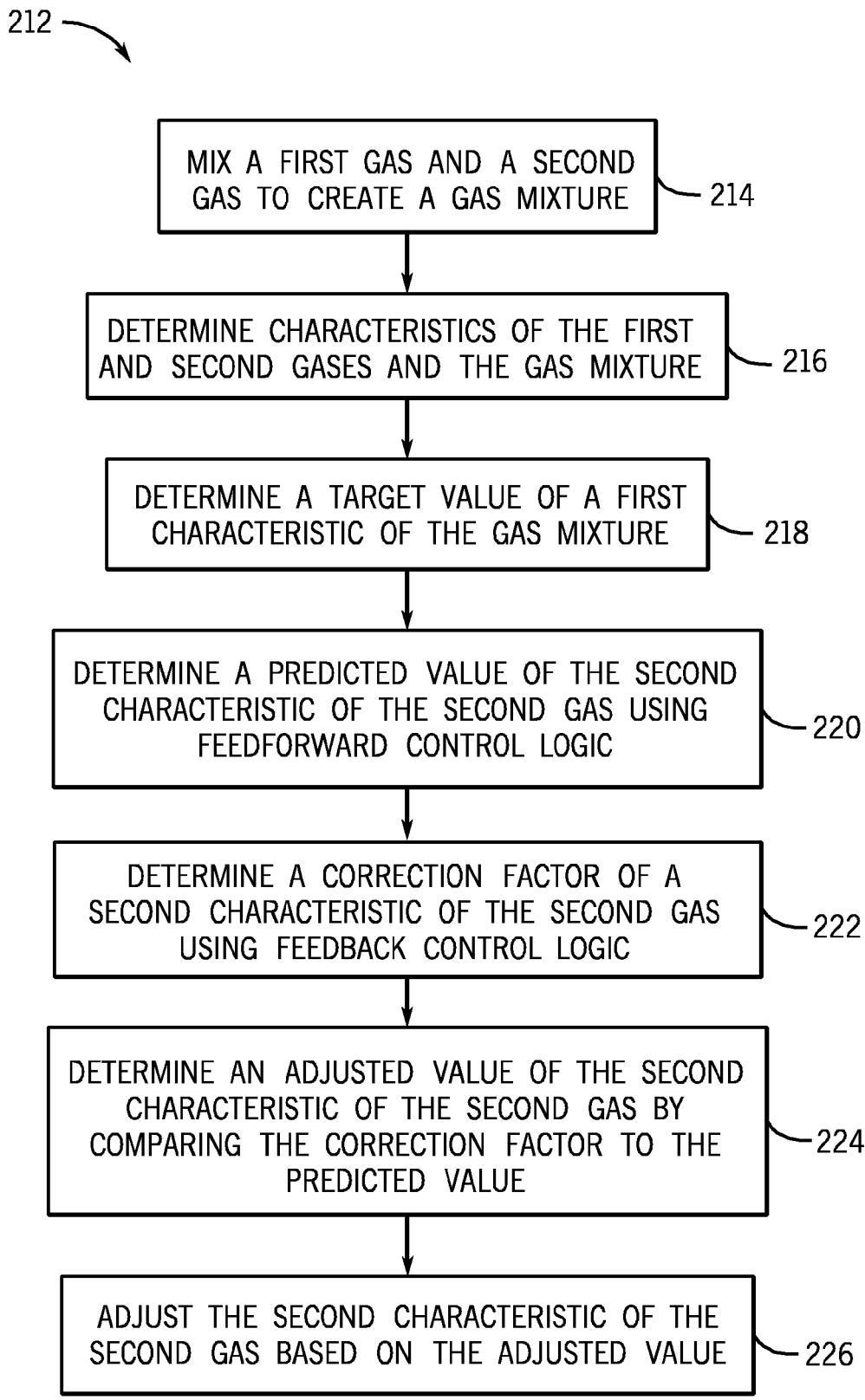
FIG. 10 is a flow chart of an embodiment of a method for controlling the blending of gases, utilizing the controller logic of FIG. 8.

FIG. 10 is a flow chart of an embodiment of a method 212 for controlling the blending of gases, utilizing the controller logic of FIG. 8. In step 214, a first gas and a second gas may be mixed to create a gas mixture. In particular, the first and second gases may be the blast furnace gas 84 and the coke oven gas 76 received from the steel mill 68 to create a fuel gas 66 mixture for use by the gas turbine 12. In step 216, characteristics of the first and second gases and the resultant gas mixture may be determined. For instance, the LHVs of the blast furnace gas 84 and the coke oven gas 76 may be measured by the gas chromatographs 106, 108 and the calorimeters 110, 112 of the fuel gas cleanup and blending system 90, as illustrated in FIG. 4. Additionally, the LHV of the fuel gas 66 mixture may be measured at the inlet of the fuel gas control module 94 by the fuel gas calorimeter 166, as illustrated in FIG. 6. In addition, flow rates of the blast furnace gas 84 and coke oven gas 76 may be measured by the flowmeters 122, 124 of the fuel gas cleanup and blending system 90, as illustrated in FIG. 4.

In step 218, a target value for a first characteristic of the gas mixture may be determined. For instance, a target LHV for the fuel gas 66 mixture may be determined. In step 220, a predicted value of a second characteristic of the second gas may be determined using feedforward control logic and the determined characteristics (from step 216) of the first and second gases and the gas mixture. In particular, a predicted value of the flow rate of the coke oven gas 76 may be determined using feedforward control logic and the measured LHVs of the blast furnace gas 84, the coke oven gas 76, and the fuel gas 66 mixture and the measured flow rates of the blast furnace gas 84 and the fuel gas 66 mixture, which are determined in step 216. In step 222, a correction factor of the second characteristic of the second gas may be determined using feedback control logic by comparing the target value of the first characteristic of the gas mixture to a measured value of the first characteristic of the gas mixture. For instance, a correction factor of the flow rate of the coke oven gas 76 may be determined based on a deviation observed between the target LHV of the fuel gas 66 mixture and the measured LHV of the fuel gas 66 mixture.

In step 224, an adjusted value of the second characteristic of the second gas may be determined by comparing the correction factor (from step 220) to the predicted value (from step 222). In particular, an adjusted value of the flow rate of the coke oven gas 76 may be determined based on a correction needed to meet the target LHV of the fuel gas 66 mixture. In step 226, the second characteristic of the second gas may be adjusted based on the adjusted value determined in step 224. For instance, the flow rate of the coke oven gas 76 may be adjusted by modulating the flow control valve 120 of FIG. 4 based on the adjusted value.

Technical effects of the invention include providing a controller 96 having controller logic 188 configured to control the blending of blast furnace gas 84 and coke oven gas 76 from the steel mill 68. By controlling the blending of these two steel mill 68 by-product gases, the controller 96 may ensure that characteristics of the fuel gas 66 mixture delivered to the gas turbine 12 meet certain operating parameters for the gas turbine 12. For example, the heating value of fuel gas 66 delivered to the gas turbine 12 may be maintained within acceptable minimum and maximum values. In doing so, the stability of the operation of the gas turbine 12 may be increased. In particular, combustion blowout and stalling of the gas turbine 12 may be minimized. In addition, by ensuring that blending of the blast furnace gas 84 and the coke oven gas 76 is accomplished more effectively, the recovery of energy within these by-products gases of the steel mill 68 may be enhanced. It should also be noted that while the embodiments disclosed herein are directed toward the blending of blast furnace gas 84 and coke oven gas 76, the control techniques described herein may be extended to the blending of other fuel and diluent sources. For example, in certain embodiments, the control techniques described herein may be used to control the blending of Corex with Nitrogen to obtain a target LHV for the Corex-Nitrogen blend.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a fuel system, comprising:
a fuel blending system configured to blend a first fuel with a second fuel in a ratio to produce a third mixed fuel, wherein the first fuel has a first heating value, the second fuel has a second heating value, and the third mixed fuel has a third heating value, wherein the first heating value is lower than the second heating value;
a feedforward controller configured to adjust the ratio of the first and second fuels to correct the third heating value, wherein the feedforward controller is configured to predict an adjusted flow rate of the second fuel to correct the third heating value based on measured fuel flow rates of the first fuel and the third mixed fuel and measured heating values of the first fuel, the second fuel, and the third mixed fuel; and
comprising a gas turbine engine coupled to the fuel system.

2. The system of claim 1, wherein the feedforward controller is configured to adjust the ratio of the first and second fuels based at least in part on changes in moisture levels of the third mixed fuel, wherein the changes in moisture levels are introduced by cooling of the third mixed fuel.

3. The system of claim 1, wherein the first fuel comprises blast furnace gas and the second fuel comprises coke oven gas.

4. The system of claim 1, wherein the fuel system comprises:
a fuel cleanup system configured to remove particulates from the first fuel, the second fuel, and the third mixed fuel;
a fuel compression system configured to increase pressure of the third mixed fuel; and
a fuel control module configured to distribute the third mixed fuel to the gas turbine engine.

5. The system of claim 1, comprising calorimeters that provide measured heating values of the first fuel, the second fuel, and the third mixed fuel to the feedforward controller, and flow meters that provide measured fuel flow rates to the feedforward controller.

6. The system of claim 5, wherein a feedback controller is configured to determine a correction factor of the fuel flow rate of the first fuel and/or the second fuel based at least in part on a comparison between a target heating value of the third mixed fuel to the measured heating value of the third mixed fuel.

7. A system, comprising:
a turbine fuel blending controller, comprising:
a feedforward control logic configured to predict a fuel flow rate of a first fuel and/or a second fuel being mixed to provide a third mixed fuel, wherein the first and second fuels have different heating values from one another, wherein the feedforward control logic is configured to predict the fuel flow rate of the second fuel based on a target heating value of the third mixed fuel, measured fuel flow rates of the first fuel and the third mixed fuel, and measured heating values of the first fuel, the second fuel, and the third mixed fuel;
a feedback control logic configured to correct the fuel flow rate based at least in part on a comparison between the target heating value and a measured heating value of the third mixed fuel, the predicted fuel flow rate of the second fuel, the measured fuel flow rates of the first fuel and the third mixed fuel, and the measured heating values of the first fuel, the second fuel, and the third mixed fuel; and
comprising a gas turbine engine configured to receive the third mixed fuel.

8. The system of claim 7, wherein the feedback control logic is configured to correct the fuel flow rate based at least in part on changes in moisture levels of the third mixed fuel, wherein the changes in moisture levels are introduced by cooling of the third mixed fuel.

9. The system of claim 7, wherein the first fuel comprises blast furnace gas and the second fuel comprises coke oven gas.

10. A method for a gas turbine fuel system, comprising:
blending a first fuel with a second fuel in a ratio to produce a third mixed fuel, wherein the first fuel has a first heating value, the second fuel has a second heating value, and the third mixed fuel has a third heating value, wherein the first heating value is different than the second heating value; and
feedforward controlling the third heating value of the third mixed fuel via prediction and correction of a fuel flow rate of the first and/or second fuels to adjust the ratio of the first and second fuels based at least in part on a comparison between a measurement and a target for the third heating value, wherein the feedforward controlling comprises determining a predicted value of the fuel flow rate of the second fuel based on measured heating values of the first fuel, the second fuel, and the third mixed fuel and measured fuel flow rates of the first fuel and the third mixed fuel.

11. The method of claim 10, comprising:
receiving the first fuel from a blast furnace as blast furnace gas; and
receiving the second fuel from a coke oven as coke oven gas.

12. The method of claim 11, comprising:
measuring heating values of the blast furnace gas, the coke oven gas, and the third mixed fuel;
measuring fuel flow rates of the blast furnace gas and the fuel gas mixture;
determining a target heating value of the third mixed fuel;
determining a predicted value of the fuel flow rate of the coke oven gas using feedforward control logic and the measured heating values of the blast furnace gas, the coke oven gas, and the third mixed fuel and the measured fuel flow rates of the blast furnace gas and the third mixed fuel;
determining a correction factor of a fuel flow rate of the coke oven gas using feedback control logic by comparing the target heating value of the third mixed fuel to a measured heating value of the third mixed fuel;
determining an adjusted value of the fuel flow rate of the coke oven gas by comparing the correction factor to the predicted value;
adjusting the fuel flow rate of the coke oven gas by modulating a flow control valve through which the coke oven gas flows based on the adjusted value; and
delivering the third mixed fuel, including the ratio of the coke oven gas and the blast furnace gas, to a turbine engine.

13. The method of claim 10, comprising determining a correction factor of the fuel flow rate of the second fuel based at least in part on a comparison between a target heating value of the third mixed fuel to the measured heating value of the third mixed fuel.

* * * * *